Feb. 2, 1943.   P. O. LANGGUTH ET AL   2,310,097
POTENTIAL DEVICE
Filed July 31, 1940

WITNESSES:
N. F. Susser
R. J. Fitzgerald

INVENTORS
Paul O. Langguth and
Edwin L. Harder.
BY
Franklin E. Hardy
ATTORNEY

Patented Feb. 2, 1943

2,310,097

UNITED STATES PATENT OFFICE 2,310,097

POTENTIAL DEVICE

Paul O. Langguth, Irwin, and Edwin L. Harder, Forest Hills, Pa., assignors to Westinghouse Electric & Manufacturing Company, East Pittsburgh, Pa., a corporation of Pennsylvania Application July 31, 1940, Serial No. 348,774

9 Claims. (Cl. 171—119)

The invention relates to capacitance-type potential devices for use for supplying electromotive force from high-voltage sources to such devices as synchroscopes, measuring instruments, relays and the like. The capacitance means employed may be a condenser bushing or a coupling capacitor used as a capacitance potentiometer. Such devices are used to apply a voltage to electroresponsive devices that are proportional to and substantially in phase with the voltage of the source.

The conventional capacitor-type potential devices in use are dependent for their necessary characteristics upon the proper adjustment of units external to the potential transformer supplying the burden, and which usually consists of a variable resistance, inductance and capacitance used jointly or separately dependent upon the specific application of the device. These units are variable and are adjusted to provide the proper phase angle and voltage ratio for a given burden supplied from the device.

In accordance with the invention, means is provided for controllably varying the leakage reactance of the potential transformer to provide the necessary tuning reactance required for resonance to accomplish the same purpose as has previously been accomplished by the separately attached units now employed. This arrangement permits the elimination of these separate units, together with the loading of the secondary circuit occasioned by their use, thus permitting larger outputs for the connected burden.

It is an object of the invention to provide a capacitor-type potential device having a potential transformer between the high-voltage source and the low-voltage circuit in which the leakage reactance of the connecting transformer may be adjusted to provide the necessary reactance required for resonance.

It is a further object of the invention to provide for increasing the burden capacity of the potential device by eliminating the use of variable impedance devices in the secondary circuit of the transformer, thus eliminating the load caused by such devices and errors caused by variations in the characteristics of such devices.

Other objects and advantages of the invention will appear from the following description of the preferred embodiment, reference being had to the accompanying drawing, in which.

Figure 1:
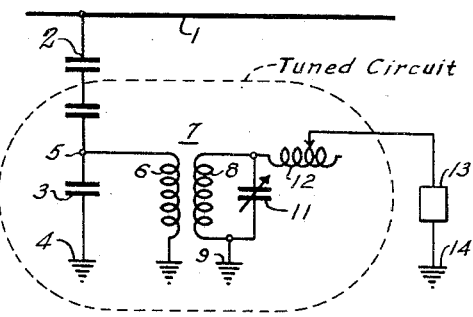
Figure 1 is a diagrammatic view of apparatus and circuits illustrating a prior art capacitance-type potential device.

Referring to Fig. 1, the numeral 1 indicates a conductor of an alternating-current, high-voltage system which may be one conductor of a polyphase circuit, to one end of which a coupling capacitor or capacitance potentiometer, comprising condensers 2 and 3, is connected, the other end of the capacitance potentiometer being connected to ground at 4. The upper section 2 of the group of capacitors comprises the "stack," and the lower section 3 the "tap" capacity. A tap 5 between these two sections provides one terminal for the primary winding 6 of a potential transformer 7, the other terminal of which is connected to ground. The transformer 7 is provided with a secondary winding 8, one terminal of which is connected to ground at 9.

A variable condenser 11 is connected across the winding 8, and a variable inductance 12 in series between the transformer 8 and the burden 13, the opposite terminal of which is connected to ground at 14. The variable reactor 12 and the variable capacitor 11 are provided for neutralizing the effective series capacitance of the source by introducing a series reactance between the source and the burden. The reactor 12 is so adjusted that, together with the capacitors 11 and 3, a tuned circuit is established resonant to the frequency of the current traversing the line conductor 1 to which the tuned circuit is capacitively coupled by the capacitance potentiometer comprising sections 2 and 3. As a result, the alternating potential impressed on the tuned circuit causes current to flow through the burden 13, the capacitor 11 and reactor 12 in such manner that the voltage drop across the condensers and the reactor balance out, and the potential across the burden 13 is substantially proportional to and in phase with the line voltage to ground.

Figure 2:
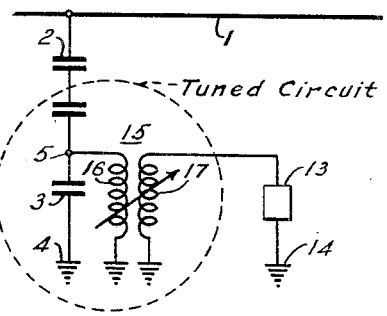
Fig. 2 is a diagrammatic view of apparatus and circuits illustrating a preferred embodiment of the invention.

In the potential device shown diagrammatically in Fig. 2, a variable reactance transformer 15 is substituted for the potential transformer 7 of Fig. 1 and controlled in such a way as to neutralize the effective series capacitance of the source, thus eliminating the necessity for using the capacitor 11 and reactor 12 shown in Fig. 1. The leakage reactance of the transformer 15 is controlled to provide a circuit resonant with the capacitance of the potentiometer connected to the primary side of the transformer 15. The dotted lines in Figs. 1 and 2 identify the resonant circuits of the two systems. It will be appreciated that, if desired, the capacitance potentiometer might be connected between the circuit conductors of an alternating voltage source, instead of between a conductor and ground, and that the primary winding of the transformer 15 may be connected across another selected portion of the potentiometer or in series therewith.

Figure 3:
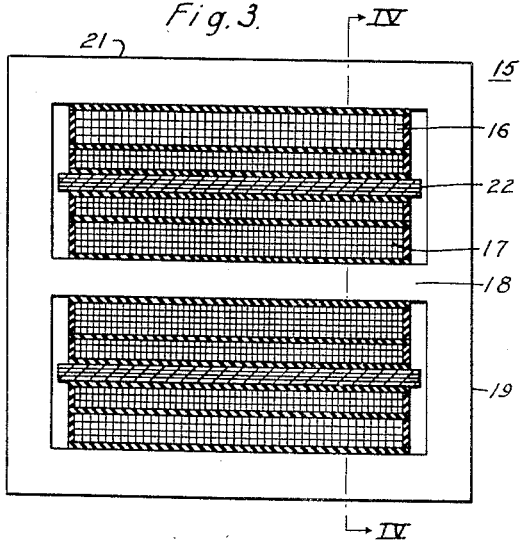
Fig. 3 is a view partly in section of a variable reactance transformer that may be employed in the circuit of Fig. 2.
Figure 4:
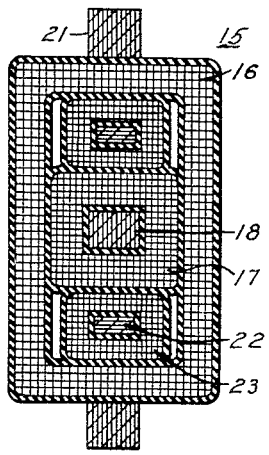
Fig. 4 is a sectional view along the line IV—IV of Fig. 3.
Figure 5:
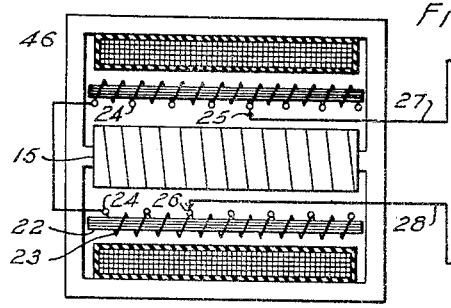
Fig. 5 is a diagrammatic view showing a circuit arrangement of the tertiary winding used in the transformer shown in Figs. 3 and 4.
Figure 5:
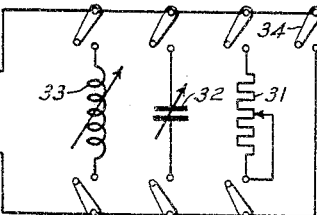

The transformer 15, as best shown in Figs. 3 and 4, comprises a primary or high-voltage winding 16 and a secondary or low-voltage winding 17 positioned about the winding leg 18 of a core structure indicated generally at 19 and comprising, together with the winding leg, two outer legs 21 parallel thereto connected by yoke members for completing the magnetic circuit. Magnetic shunts 22 comprising laminations of magnetic material are provided in the space between the primary and secondary windings, having their ends adjacent the yoke portions of the core to form leakage paths for the magnetic flux between the primary and secondary windings. A tertiary winding 23 is positioned about each of the magnetic shunts 22 and, as best shown in Fig. 5, may be provided with a number of tap points 24, to selected ones of which the terminals 25 and 26 of an external circuit may be connected, permitting current to flow from the windings 23 through conductors 27 and 28 and one or more of a plurality of devices including a resistance device 31, capacitor 32, and a reactor 33. If desired, the circuit from the windings 23 may be closed through a switch 34 to short circuit the windings 23 or selected portions thereof as determined by the tap points 24.

In providing the taps on the tertiary winding, the reluctance of the magnetic shunt may be varied to vary the path of the leakage flux between the magnetic shunt and the main core, so that a greater or lesser amount of the leakage flux will tend to flow through the main core. By connecting varying amounts of resistance, capacitance or reactance jointly or separately across the tertiary winding, the quantity relationship of this leakage flux with respect to the main flux may be controlled, thereby controlling the phase angle characteristics of the voltage supplied to the burden.

A capacitance-type potential device constructed in accordance with the invention increases the burden capacity of the device and overall performance accuracy in eliminating the internal loading occasioned by the use of the adjustable capacitor and adjustable reactor formerly used in the secondary circuit. A potential device having improved voltage performance and regulation characteristics results from the above improvements.

Modifications in the apparatus and circuits illustrated and described will occur to those skilled in the art within the spirit of our invention, and we do not wish to be limited otherwise than by the scope of the appended claims.

We claim as our invention:

1. In combination, a source of alternating electromotive force, a plurality of condensers connected to said source, a transformer having a primary winding and a secondary winding, said primary winding being connected to said condensers, a voltage-responsive instrument connected to said secondary winding, and means for selectively adjusting the reactance of said transformer to provide the necessary tuning reactance for maintaining the desired voltage ratio and phase difference between the voltage on the primary and on the secondary of the transformer.

2. In combination, a source of alternating electromotive force, a plurality of condensers connected to said source, a transformer having a primary winding and a secondary winding, said primary winding being connected to said condensers, a voltage-responsive instrument connected to said secondary winding, means for selectively adjusting the reactance of said transformer to provide the necessary tuning reactance for maintaining the desired voltage ratio and phase difference between the voltage on the primary and on the secondary of the transformer comprising a magnetic shunt between the primary and secondary windings of the transformer, a tertiary winding about the magnetic shunt and a circuit connected thereto, and means comprising a plurality of tap connections for varying the effective number of turns of said tertiary winding.

3. In combination, a source of alternating electromotive force, a plurality of condensers connected in series across said source, a transformer having a primary winding and a secondary winding, said primary winding being connected across a portion of said condensers, a voltage-responsive instrument connected to said secondary winding, means for selectively adjusting the reactance of said transformer to provide the necessary tuning reactance for maintaining the desired voltage ratio and phase difference between the voltage on the primary and on the secondary of the transformer comprising a magnetic shunt between the primary and secondary windings of the transformer, a tertiary winding about the magnetic shunt and a circuit connected thereto, means comprising a plurality of tap connections for varying the effective number of turns of said tertiary winding, and means external to the tertiary winding for varying the impedance of the tertiary winding circuit.

4. In combination, a source of alternating electromotive force, a plurality of condensers connected across said source, a transformer having a primary winding and a secondary winding, said primary winding being connected in circuit with said condensers, a voltage-responsive instrument connected to said secondary winding, a magnetic shunt between the primary and secondary windings of the transformer providing a path for leakage flux, a tertiary winding about the magnetic shunt, and means in circuit therewith for selectively adjusting the quantity relationship of the leakage flux through the magnetic shunt with respect to the main flux for adjusting the phase angle between the voltage of the source and the voltage impressed on the voltage-responsive instrument.

5. In combination with a source of alternating electromotive force, a capacitance potentiometer connected across said source, a circuit including a voltage transformer having a primary winding connected across a portion of said potentiometer, a secondary winding connected to a voltage-responsive device, and means for adjusting the leakage reactance of the transformer to correct the phase-angle error of the voltage impressed on said voltage-responsive device to render said voltage proportional to and substantially in phase with the voltage of the alternating-current circuit.

6. In combination with a high-tension alternating-current circuit, a capacitance potentiometer connected between a circuit conductor and ground, a tap from said potentiometer for obtaining a voltage therefrom, a circuit including a voltage transformer having a primary winding connected between said tap and ground, a secondary winding connected to a voltage responsive device, a magnetic shunt between the primary and secondary windings of the transformer providing a path for leakage flux, a tertiary winding about the magnetic shunt, and means in circuit therewith for adjusting the quantity relationship of the leakage flux through the magnetic shunt with respect to the main flux for adjusting the phase angle between the voltage of the source and the voltage on the voltage-responsive instrument.

7. In combination with a high-tension alternating-current circuit, a capacitance potentiometer connected between a circuit conductor and ground, a tap from said potentiometer for obtaining a voltage therefrom, a circuit including a voltage transformer having a primary winding connected between said tap and ground, a secondary winding connected to a voltage-responsive device, and means for adjusting the leakage reactance of the transformer to correct the phase-angle error of the voltage impressed on said voltage-responsive device to render said voltage proportional to and substantially in phase with the voltage of the alternating-current circuit comprising a magnetic shunt between the primary and secondary windings of the transformer and a tertiary winding about the magnetic shunt and a circuit connected thereto, and means comprising a plurality of tap connections for varying the effective number of turns of said tertiary winding.

8. In combination with a high-tension alternating-current circuit, a capacitance potentiometer connected between a circuit conductor and ground, a tap from said potentiometer for obtaining a voltage therefrom, a circuit including a voltage transformer having a primary winding connected between said tap and ground, a secondary winding connected to a voltage responsive device, means for adjusting the leakage reactance of the transformer to correct the phase-angle error of the voltage impressed on said voltage-responsive device to render said voltage proportional to and substantially in phase with the voltage of the alternating-current circuit, comprising a magnetic shunt between the primary and secondary transformer windings, and means for varying the reluctance of the shunt.

9. In combination, a source of alternating electromotive force, a plurality of condensers connected to said source, a transformer comprising a core of magnetic material including a winding leg, primary and secondary windings thereon positioned the one about the other about a common axis, said primary winding being connected to said condensers, a voltage responsive instrument connected to said secondary winding, means for adjusting the reactance of the transformer to provide the necessary tuning reactance for maintaining the desired voltage ratio and phase angle difference between the voltage on the primary and on the secondary of the transformer comprising a magnetic shunt between the primary and secondary windings of the transformer extending along the outside of the inner one of the two windings and within the outer one of the two windings, an auxiliary winding about the magnetic shunt and a circuit connected thereto, and means comprising a plurality of tap connections for varying the effective number of turns of said auxiliary winding.

PAUL O. LANGGUTH.
EDWIN L. HARDER.